(12) United States Patent
Shimazoe

(10) Patent No.: US 11,417,896 B2
(45) Date of Patent: Aug. 16, 2022

(54) PRODUCTION METHOD FOR SEPARATOR INTEGRATED GASKET FOR FUEL CELLS

(71) Applicant: NOK CORPORATION, Tokyo (JP)

(72) Inventor: Toshihiro Shimazoe, Kikugawa (JP)

(73) Assignee: NOK CORPORATION

( * ) Notice: Subject to any disclaimer, the term of this patent is extended or adjusted under 35 U.S.C. 154(b) by 892 days.

(21) Appl. No.: 16/316,279

(22) PCT Filed: Jul. 12, 2017

(86) PCT No.: PCT/JP2017/025359
§ 371 (c)(1),
(2) Date: Jan. 8, 2019

(87) PCT Pub. No.: WO2018/034085
PCT Pub. Date: Feb. 22, 2018

(65) Prior Publication Data
US 2021/0273244 A1    Sep. 2, 2021

(30) Foreign Application Priority Data

Aug. 16, 2016  (JP) ............................. JP2016-159510

(51) Int. Cl.
*B29C 45/14*  (2006.01)
*H01M 8/0286*  (2016.01)
(Continued)

(52) U.S. Cl.
CPC ..... *H01M 8/0286* (2013.01); *B29C 45/14336* (2013.01); *H01M 8/0256* (2013.01);
(Continued)

(58) Field of Classification Search
CPC ........ B29C 45/14344; B29C 45/14467; B29C 2045/14368; B29C 2045/14532; B29C 2045/1454
See application file for complete search history.

(56) References Cited

U.S. PATENT DOCUMENTS 7,226,685 B2  6/2007 Kuroki et al.
8,206,875 B2  6/2012 Yamamoto et al.
(Continued)

FOREIGN PATENT DOCUMENTS

CN     1476646 A    2/2004
CN   101032046 A    9/2007
(Continued)

OTHER PUBLICATIONS

Extended European Search Report for Application No. EP 17 84 1313 dated Jul. 15, 2019 (8 pages).

*Primary Examiner* — Edmund H Lee
(74) *Attorney, Agent, or Firm* — Harness, Dickey & Pierce, P.L.C.

(57) ABSTRACT

This invention provides a highly reliable separator integrated gasket for fuel cells free from deformation of a separator in a gasket molding process. In order to achieve the object, a pair of separators having adjacent portions approaching each other and separation portions separating from each other in a stacked state and having manifold holes opened in the separation portions are stacked via a spacer in which an inner peripheral hole is opened and which enables the circulation of a fluid in a direction orthogonal to the stacking direction so that the manifold hole and the inner peripheral hole are continuous to each other, a stacked object of the separators and the spacer is disposed in a mold, and then a rubber molding material is charged into and cured in gasket molding cavities defined between a surface opposite to the spacer in the separator and the mold.

6 Claims, 14 Drawing Sheets

(51) Int. Cl.
*H01M 8/2483* (2016.01)
*H01M 8/0256* (2016.01)
*H01M 8/0284* (2016.01)
*B29K 21/00* (2006.01)
*B29L 31/26* (2006.01)
*B29L 31/34* (2006.01)

(52) U.S. Cl.
CPC ....... *H01M 8/0284* (2013.01); *H01M 8/2483* (2016.02); *B29K 2021/003* (2013.01); *B29L 2031/265* (2013.01); *B29L 2031/3468* (2013.01)

(56) References Cited

U.S. PATENT DOCUMENTS

| | | | |
|---|---|---|---|
| 9,178,226 B2 | 11/2015 | Masaka et al. | |
| 9,562,609 B2* | 2/2017 | Shimazoe | H01M 8/0258 |
| 9,705,139 B2 | 7/2017 | Goebel et al. | |
| 10,103,364 B2* | 10/2018 | Horimoto | F16J 15/122 |
| 10,347,922 B2* | 7/2019 | Jin | H01M 8/0273 |
| 10,403,907 B2* | 9/2019 | Lim | H01M 8/0247 |
| 10,854,894 B2* | 12/2020 | Shimazoe | H01M 8/0286 |
| 2004/0096730 A1 | 5/2004 | Kuroki et al. | |
| 2006/0166076 A1 | 7/2006 | Kuroki et al. | |
| 2008/0124458 A1 | 5/2008 | Okabe | |
| 2009/0286136 A1 | 11/2009 | Yamamoto et al. | |
| 2012/0107718 A1 | 5/2012 | Masaka et al. | |
| 2014/0197605 A1 | 7/2014 | Shimazoe et al. | |
| 2015/0180053 A1* | 6/2015 | Jin | B29C 45/14336 429/400 |
| 2015/0295210 A1 | 10/2015 | Horimoto et al. | |
| 2016/0036068 A1 | 2/2016 | Goebel et al. | |
| 2017/0207468 A1* | 7/2017 | Shimazoe | H01M 8/0284 |
| 2018/0175403 A1* | 6/2018 | Lim | H01M 8/0276 |

FOREIGN PATENT DOCUMENTS

| | | |
|---|---|---|
| CN | 101432916 A | 5/2009 |
| CN | 102804468 A | 11/2012 |
| CN | 103765058 A | 4/2014 |
| CN | 104755818 A | 7/2015 |
| CN | 105322108 A | 2/2016 |
| JP | 2007-220403 A | 8/2007 |
| JP | 2007-250192 A | 9/2007 |
| JP | 2008-204704 A | 9/2008 |
| JP | 2010-049920 A | 3/2010 |
| JP | 2010-113995 A | 5/2010 |
| JP | 2014-093212 A | 5/2014 |
| JP | 2015-225709 A | 12/2015 |
| JP | 2016-058156 A | 4/2016 |

\* cited by examiner

PRODUCTION METHOD FOR SEPARATOR INTEGRATED GASKET FOR FUEL CELLS

CROSS REFERENCE TO RELATED APPLICATIONS

This application is a U.S. National Stage application of International Application No. PCT/JP2017/025359 filed on Jul. 12, 2017 and published in Japanese as WO 2018/034085 on Feb. 22, 2018 and claims priority to Japanese Patent Application No. 2016-159510 filed on Aug. 16, 2016. The entire disclosures of the above applications are expressly incorporated by reference herein.

BACKGROUND

Technical Field

The present invention relates to a production method for a separator integrated gasket for sealing a flow passage formed in each cell of a fuel cell.

Related Art

As illustrated in FIG. 28 as an example, separators 101 and 102 and a fuel cell configure a fuel battery cell which is the minimum unit for power generation by a MEA (Membrane Electrode Assembly) 200 containing an electrolyte membrane and catalyst electrode layers (not illustrated) provided on both surfaces thereof, and a large number of the fuel battery cells are stacked and electrically connected in series to produce a fuel cell stack, whereby required electromotive force is obtained.

At the mutually corresponding positions in the separators 101 and 102 and a MEA 200, manifold holes 101a, 102a, and 200a, respectively, are opened. Due to the fact that the manifold holes 101a, 102a, and 200a are overlapped with each other in the stacked state illustrated in FIG. 28, a plurality of manifolds for circulating a coolant, an oxidizer gas, or a fuel gas are formed in the stacking direction of the fuel battery cells. FIG. 28 illustrates only a coolant manifold 110 of the plurality of manifolds.

In the separators 101 and 102, adjacent portions 101b and 102b approaching each other in the stacked state are formed along the outer peripheral portions thereof, separation portions 101c and 102c separating from each other in the stacked state are formed in a part of the inner peripheral sides thereof, regions on the inner peripheral sides relative to the adjacent portions 101b and 102b and the separation portions 101c and 102c are formation regions of flow passage grooves 101d and 102d corresponding to a power generation region by the MEA 200, and the manifold holes 101a and 102a are positioned and opened at the separation portions 101c and 102c. The separators 101 and 102 are integrated with each other via a welded portion 103 in which the adjacent portions 101b and 102b are welded. In the separator 101, a gasket 104 extending along the outer periphery of the manifold hole 101a and a gasket 105 extending along the outer periphery of the separator 101 are integrally provided and in the separator 102, a gasket 106 extending along the outer periphery of the manifold hole 102a and a gasket 107 extending along the outer periphery of the separator 102 are integrally provided, whereby a separator integrated gasket 100 is configured.

The gaskets 104 and 105 and the gaskets 106 and 107 are formed in opposite directions in the thickness direction and are brought into close contact with the MEAs 200 from both sides in the thickness direction in the stacked state illustrated in FIG. 28. Thus, a coolant flow passage 111 communicating with the coolant manifold 110 is formed between the separators 101 and 102, a fuel gas flow passage 112 communicating with a fuel gas manifold (not illustrated) is formed between the separator 102 and the MEA 200, and an oxidizer gas flow passage 113 communicating with an oxidizer gas manifold (not illustrated) is formed between the separator 101 and the MEA 200.

More specifically, in the fuel cell of this type, a fuel gas (hydrogen) circulating through the fuel gas flow passage 112 by the flow passage groove 101d of the separator 101 via the fuel gas manifold (not illustrated) is supplied to the side of one catalyst electrode layer (anode) of the MEA 200 and an oxidizer gas (air) circulating through the oxidizer gas flow passage 113 by the flow passage groove 102d of the separator 102 via the oxidizer gas manifold (not illustrated) is supplied to the side of the other catalyst electrode layer (cathode) of the MEA 200 to cause a reverse reaction of electrolysis of water, i.e., a reaction of generating water from hydrogen and oxygen, to generate electric power. A coolant for removing the heat accompanying the power generation circulates through the coolant flow passage 111 between the flow passage grooves 101d and 102d via the coolant manifold 110 (for example, see Japanese Unexamined Patent Application Publication No. 2010-49920).

In the fuel cell of the configuration described above, the separator integrated gasket 100 containing the separators 101 and 102 and the gaskets 104 to 107 is produced by a method illustrated in FIG. 29.

More specifically, the separators 101 and 102 are first integrated with each other by welding (welded portion 103), the separators 101 and 102 are positioned and disposed between split molds 301 and 302 of a vulcanization molding mold 300, and then a liquid rubber molding material is injected and charged into cavities 303 and 304 defined between the inner surface of the mold 300 and the separation portion 101c of the separator 101 or the separation portion 102c of the separator 102 by mold clamping and then cured, whereby the gaskets 104 and 105 illustrated in FIG. 28 are bonded to the separator 101 simultaneously with the molding and the gaskets 106 and 107 on the opposite side are similarly bonded to the separator 102 simultaneously with the molding.

However, in the gasket molding process described above, the separators 101 and 102 are likely to be bent and deformed around the manifold holes 101a and 102a (separation portions 101c and 102c) by the pressure of the rubber molding material injected and charged into the cavities 303 and 304. FIG. 30 illustrates a state where the separation portion 101c of the separator 101 is bent and deformed in the molding process of the gasket 104. When such modification has occurred, there is concern that, in a state where a fuel cell stack is obtained by stacking as illustrated in FIG. 28, the surface pressure of the gaskets 104 and 106 is insufficient, so that the sealability decreases and, moreover, the separation portions 101c and 102c of the separators 101 and 102, respectively, approach each other by the bending and deformation, whereby the flow passage between the coolant manifold 110 and the coolant flow passage 111 illustrated in FIG. 28 is closed, and thus the flow of the coolant is blocked.

Even when the above-described deformation does not occur in the separation portions 101c and 102c of the separators 101 and 102, respectively, and the gaskets 104 and 106 are formed in normal shapes, there is the same concern as described above when the separation portions 101c and 102c of the separators 101 and 102, respectively, are deformed by the compression reaction force of the gaskets 104 and 106 in the stacked state illustrated in FIG. 28.

The present invention has been made in view of the above-described respects. It is a technical problem to be solved of the present invention to provide a highly reliable separator integrated gasket for fuel cells free from deformation of a separator in a gasket molding process.

SUMMARY OF THE INVENTION

As a means for solving the technical problem described above, one aspect of a production method for a separator integrated gasket for fuel cells according to the present invention includes stacking a pair of separators having adjacent portions approaching each other and separation portions separating from each other in a stacked state and manifold holes opened in the separation portions via a spacer in which an inner peripheral hole is opened and which enables the circulation of a fluid in a direction orthogonal to the stacking direction so that the manifold holes and the inner peripheral hole are continuous to each other, disposing a stacked object of the separators and the spacer in a mold, and then charging a rubber molding material into a gasket molding cavity defined between the surface opposite to the spacer in the separator and the mold, and curing the rubber molding material.

As another aspect, the pair of separators may be welded with each other.

As another aspect, the spacer may enable the circulation of a fluid in the direction orthogonal to the stacking direction by a groove or a hole formed in the spacer.

As another aspect, the spacer may enable the circulation of a fluid in the direction orthogonal to the stacking direction by being porous.

Effect of the Invention

According to the present invention, the rubber molding material is charged into the cavity defined between the surface opposite to the spacer and the mold to mold the gasket in the state where the pair of separators is stacked via the spacer beforehand, and therefore the deformation of the separators due to the charging pressure of the rubber molding material is prevented by the spacer, and thus a separator integrated gasket with high reliability of sealing can be provided. Moreover, the spacer enables the circulation of a fluid in the direction orthogonal to the stacking direction, and therefore does not block the flow of a fluid which is to be circulated between the manifold and an outer peripheral region thereof.

DETAILED DESCRIPTION OF THE PREFERRED EMBODIMENTS

Hereinafter, a preferable embodiment of a production method for a separator integrated gasket for fuel cells according to the present invention is described in detail with reference to the drawings. First, FIG. 1 to FIG. 4 illustrate a fuel cell provided with a separator integrated gasket 10 for fuel cells produced according to a first embodiment of the production method for a separator integrated gasket for fuel cells according to the present invention.

In the fuel cell, a fuel battery cell which is the minimum unit for power generation is configured by metal separators 1 and 2 and a MEA 20 containing an electrolyte membrane and catalyst electrode layers (not illustrated) provided on both surfaces thereof and a large number of the fuel cell battery cells are stacked and electrically connected in series.

Figure 1:
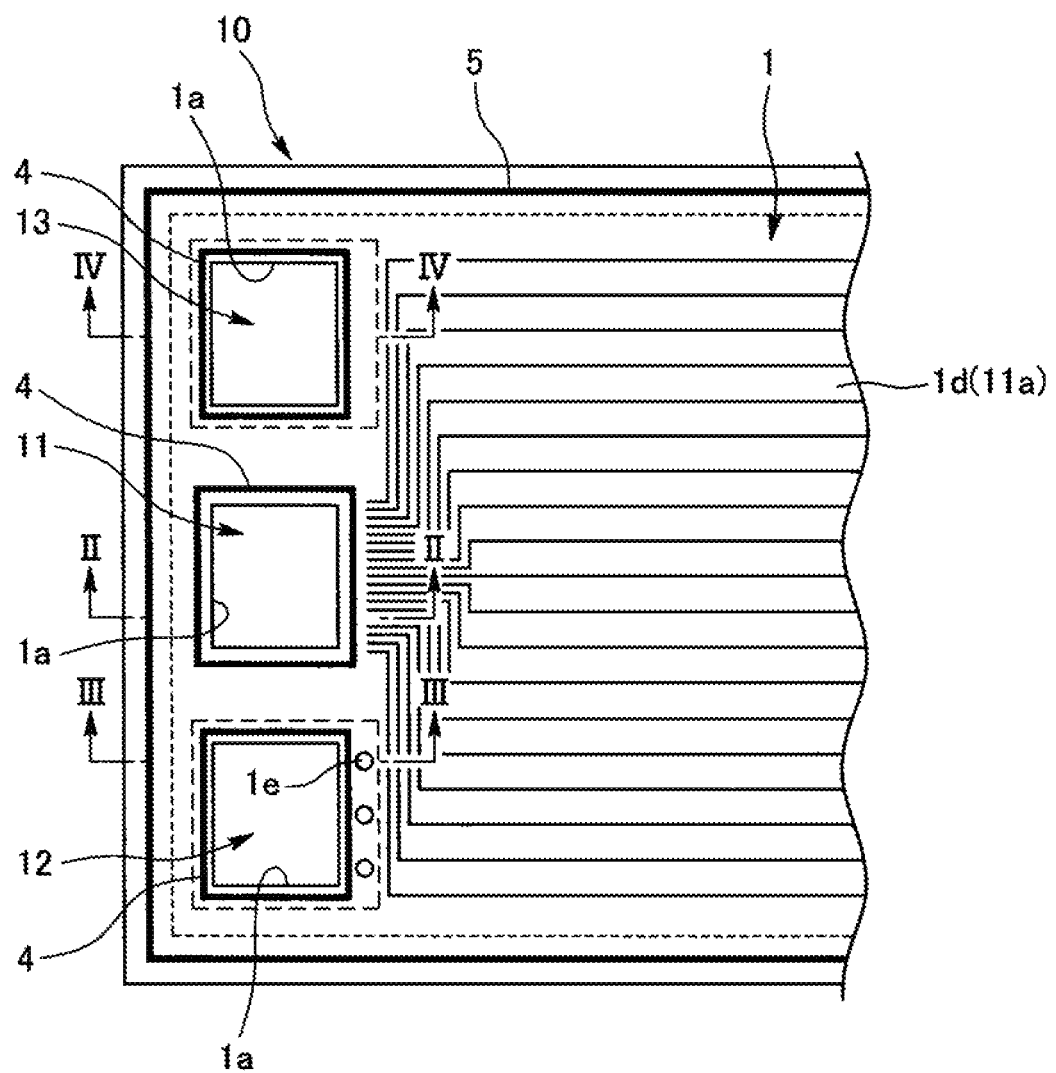
FIG. 1 is a partial plan view illustrating a fuel cell provided with a separator integrated gasket for fuel cells produced according to a first embodiment of a production method for a separator integrated gasket for fuel cells according to the present invention.
Figure 2:
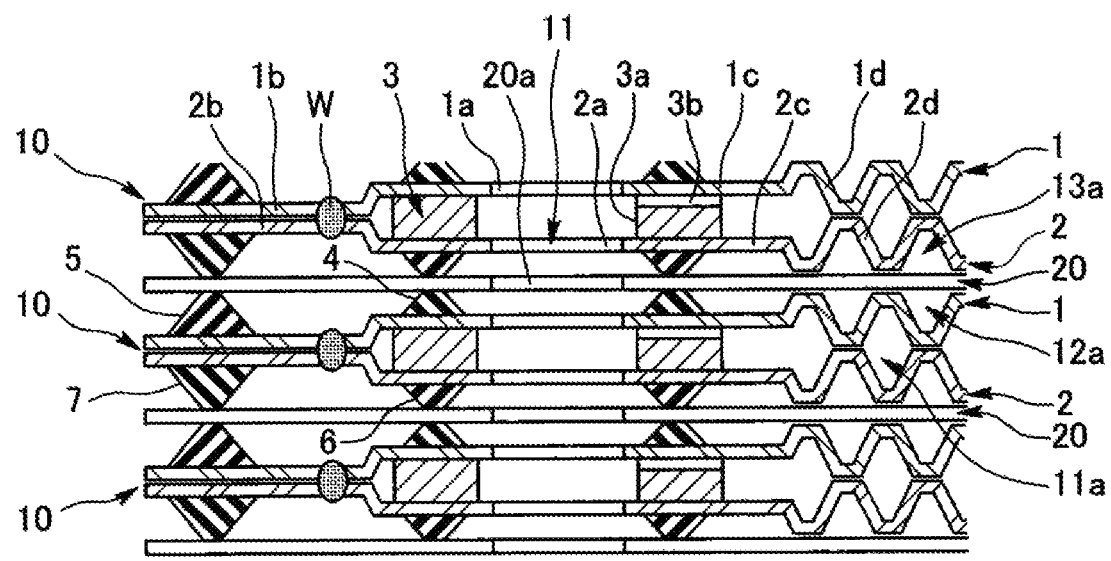
FIG. 2 is a cross-sectional view illustrating the fuel cell provided with the separator integrated gasket for fuel cells produced according to the first embodiment of the production method for a separator integrated gasket for fuel cells according to the present invention cut at the position corresponding to the II-II line of FIG. 1.
Figure 3:
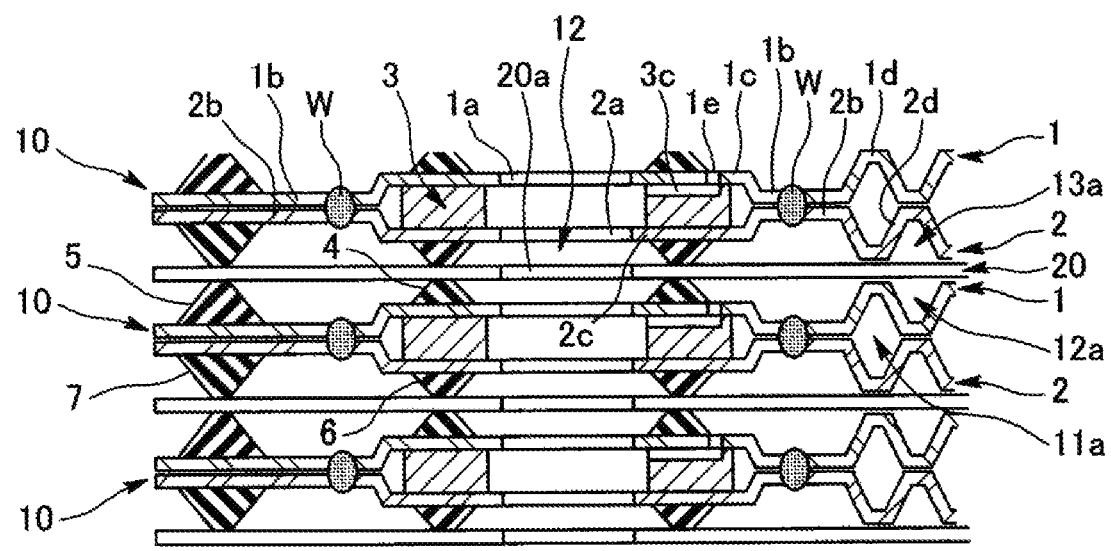
FIG. 3 is a cross-sectional view illustrating the fuel cell provided with the separator integrated gasket for fuel cells produced according to the first embodiment of the production method for a separator integrated gasket for fuel cells according to the present invention cut at the position corresponding to the III-III line of FIG. 1.
Figure 4:
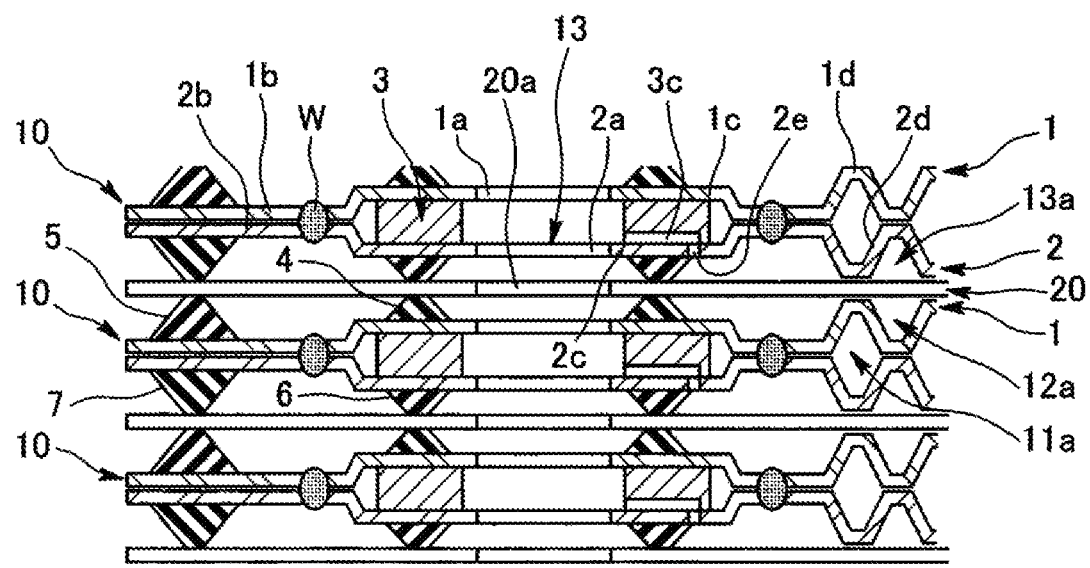
FIG. 4 is a cross-sectional view illustrating the fuel cell provided with the separator integrated gasket for fuel cells produced according to the first embodiment of the production method for a separator integrated gasket for fuel cells according to the present invention cut at the position corresponding to the IV-IV line of FIG. 1.

As illustrated in FIG. 2 to FIG. 4, in the separators 1 and 2, adjacent portions 1b and 2b approaching and abutting on each other in a stacked state are formed along outer peripheral portions thereof, separation portions 1c and 2c separating from each other in the stacked state are formed in a part of the inner peripheral sides thereof, regions on the inner peripheral sides relative to the adjacent portions 1b and 2b and the separation portions 1c and 2c are formation regions of flow passage grooves 1d and 2d corresponding to a power generation region by the MEA 20, and manifold holes 1a and 2a are opened in the separation portions 1c and 2c, respectively.

The separators 1 and 2 are integrated with each other via welded portions W in which the adjacent portion 1b and 2b are welded, a gasket 4 extending along the outer periphery of the manifold hole 1a and a gasket 5 extending along the outer periphery of the separator 1 are integrally provided on one separator 1, a gasket 6 extending along the outer periphery of the manifold hole 2a and a gasket 7 extending along the outer periphery of the separator 2 are integrally provided on the other separator 2, and a spacer 3 is present between the separation portions 1c and 2c in the separators 1 and 2, respectively, whereby the separator integrated gasket 10 is configured. More specifically, each fuel battery cell contains the separator integrated gasket 10 and the MEA 20.

At the position corresponding to the manifold holes 1a and 2a of the separators 1 and 2, respectively, in the MEA 20, a manifold hole 20a is opened. The spacer 3 has an inner peripheral hole 3a corresponding to the manifold holes 1a, 2a and 20a. Due to the fact that the manifold holes 20a, 1a, and 2a and the inner peripheral holes 3a are overlapped with each other in the stacked state of the fuel battery cells, a manifold 11 for circulating a coolant in the stacking direction of the fuel battery cells, a manifold 12 for circulating an oxidizer gas, and a manifold 13 for circulating a fuel gas are formed.

The adjacent portions 1b and 2b of the separators 1 and 2, respectively, and the welded portions W are formed so as to surround the oxidizer manifold 12 (and the fuel gas manifold 13) around the oxidizer manifold 12 (and the fuel gas manifold 13) as illustrated in FIG. 3 and FIG. 4.

The gaskets 4 and 5 provided in on separator 1 and the gaskets 6 and 7 provided on the separator 2 are formed in opposite directions in the thickness direction and are brought into close contact with the MEA 20 from both sides in the thickness direction thereof in the stacked state illustrated in FIG. 2 to FIG. 4. Thus, a coolant flow passage 11a communicating with the coolant manifold 11 is formed between the flow passage grooves 1d and 2d of the separators 1 and 2, respectively, an oxidizer gas flow passage 12a communicating with the oxidizer gas manifold 12 is formed, for example, between the flow passage groove 1d of the separator 1 and the MEA 20, and a fuel gas flow passage 13a communicating with the fuel gas manifold 13 is formed, for example, between the flow passage groove 2d of the separator 2 and the MEA 20.

Figure 5:
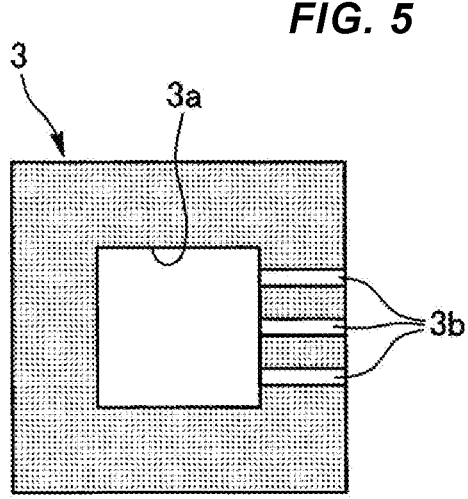
FIG. 5 is a plan view illustrating a spacer used for the positions illustrated in FIG. 2.
Figure 6:
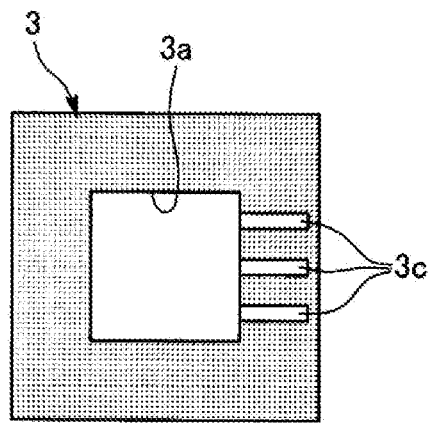
FIG. 6 is a plan view illustrating a spacer used for the positions illustrated in FIG. 3 or FIG. 4.

The spacer 3 contains a synthetic resin and the like, for example, the spacer 3 in which the inner peripheral hole 3a communicating between the manifold holes 1a and 2a of the separators 1 and 2, respectively, and configuring a part of the coolant manifold 11, the oxidizer gas manifold 12, or the fuel gas manifold 13 is opened and which has the planar shape as illustrated in FIG. 5 or FIG. 6. Among the above, the spacer 3 illustrated in FIG. 5 is interposed between the separation portions 1c and 2c in which the manifold holes 1a and 2a are opened of the separators 1 and 2, respectively, configuring the coolant manifold 11 as illustrated in FIG. 2, the spacer 3 in which grooves 3b penetrating in a direction orthogonal to the stacking direction and enabling smooth circulation of a coolant between the coolant manifold 11 and the coolant flow passage 11a are formed. The spacer 3 illustrated in FIG. 6 is interposed between the manifold holes 1a and 2a of the separators 1 and 2, respectively, configuring the oxidizer gas manifold 12 or the fuel gas manifold 13 as illustrated in FIG. 3 or FIG. 4, the spacer 3 in which grooves 3c having an end enabling smooth circulation of an oxidizer gas or a fuel gas between the oxidizer gas manifold 12 and the oxidizer gas flow passage 12a or between the fuel gas manifold 13 and the fuel gas flow passage 13a via a communication hole 1e opened in the separation portion 1c of the separator 1 or a communication hole 2e opened in the separation portion 2c of the separator 2 are formed.

More specifically, the fuel cell having the above-described configuration is configured so that a fuel gas (hydrogen) circulating through the fuel gas flow passage 13a via the groove 3c formed in the surface on the separator 2 side in the spacer 3 and the communication hole 2e opened in the separator 2 is supplied from the fuel gas manifold 13 illustrated in FIG. 4 to the side of one catalyst electrode layer (anode) of the MEA 20 and an oxidizer gas (air) circulating through the oxidizer gas flow passage 12a via the groove 3c formed in the surface on the separator 1 side in the spacer 3 and the communication hole 1e opened in the separator 1 is supplied from the oxidizer gas manifold 12 illustrated in FIG. 3 to the side of the other catalyst electrode layer (cathode) of the MEA 20 to cause a reverse reaction of electrolysis of water, i.e., a reaction of generating water from hydrogen and oxygen, to generate electric power. Moreover, a coolant for removing heat accompanying the power generation circulates through the coolant flow passage 11a from the coolant manifold 11 illustrated in FIG. 2 via the groove 3b formed in the surface on the separator 1 side in the spacer 3.

The separator integrated gasket 10 for use in the fuel cell described above is produced by the production method as the first embodiment described below.

Figure 7:
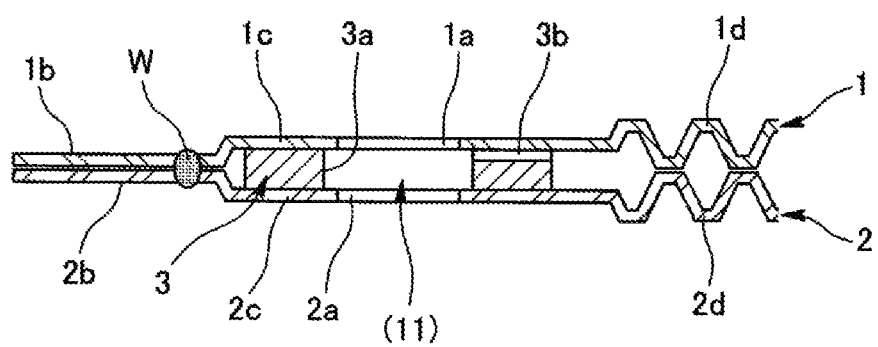
FIG. 7 is a cross-sectional view illustrating a state where separators stacked via the spacer are welded is cut at the position corresponding to the II-II line of FIG. 1 in the first embodiment of the production method for a separator integrated gasket for fuel cells according to the present invention.
Figure 8:
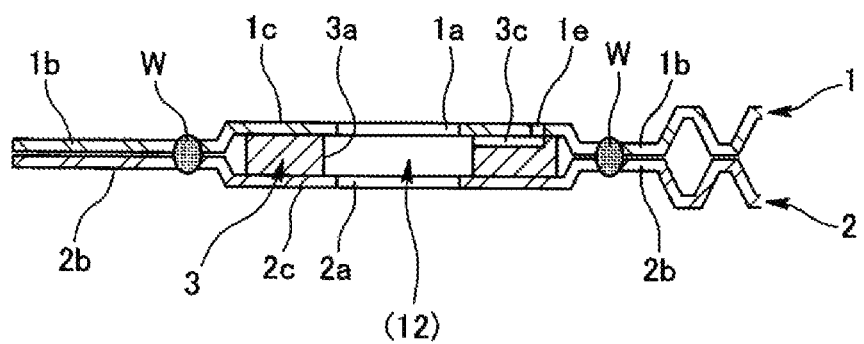
FIG. 8 is a cross-sectional view illustrating a state where the separators stacked via the spacer are welded is cut at the position corresponding to the III-III line of FIG. 1 in the first embodiment of the production method for a separator integrated gasket for fuel cells according to the present invention.
Figure 9:
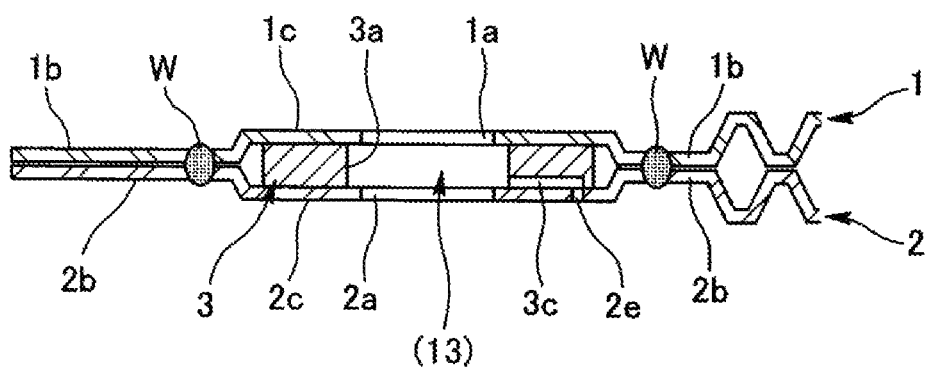
FIG. 9 is a cross-sectional view illustrating a state where the separators and the spacer are disposed in a mold is cut at the position corresponding to the IV-IV line of FIG. 1 in the first embodiment of the production method for a separator integrated gasket for fuel cells according to the present invention.

First, the separators 1 and 2 are stacked via the spacer 3 as illustrated in FIG. 7 to FIG. 9. More specifically, one having the groove 3b penetrating in the direction orthogonal to the stacking direction among the spacers 3 is disposed at a position where the coolant manifold 11 is formed as illustrated in FIG. 7, one having the groove 3c having an end in the surface opposite to the separation portion 1c of the separator 1 among the spacers 3 is disposed at a position where the oxidizer gas manifold 12 is formed as illustrated in FIG. 8, and one having the groove 3c having an end in a surface opposite to the separation portion 2c of the separator 2 is disposed at a position where the fuel gas manifold 13 is formed as illustrated in FIG. 9. At this time, each spacer 3 is positioned so that the inner peripheral hole 3a of the spacer 3 is continuous to the manifold holes 1a and 2a of the separators 1 and 2, respectively, and the groove 3c having an end communicates with the communication hole 1e or 2e of the separator 1 or 2, respectively.

Then, the adjacent portions 1b and 2b of the separators 1 and 2, respectively, approaching and abutting on each other by the stacking are welded to thereby integrate the separators 1 and 2 via the welded portions W.

Figure 10:
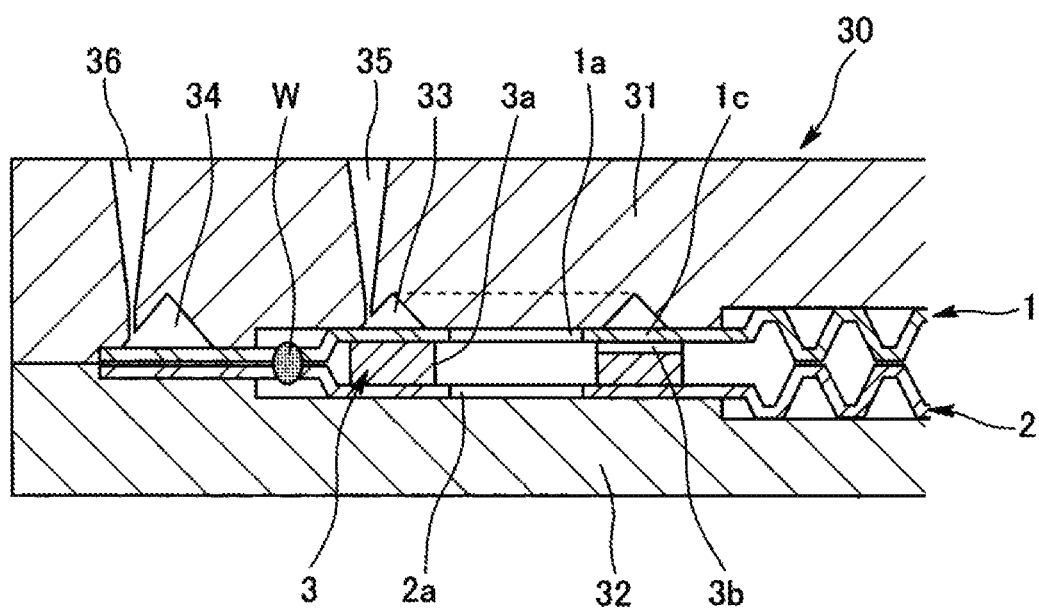
FIG. 10 is a cross-sectional view illustrating a state where the separators and the spacer are disposed in the mold is cut at the position corresponding to the II-II line of FIG. 1 in the first embodiment of the production method for a separator integrated gasket for fuel cells according to the present invention.
Figure 11:
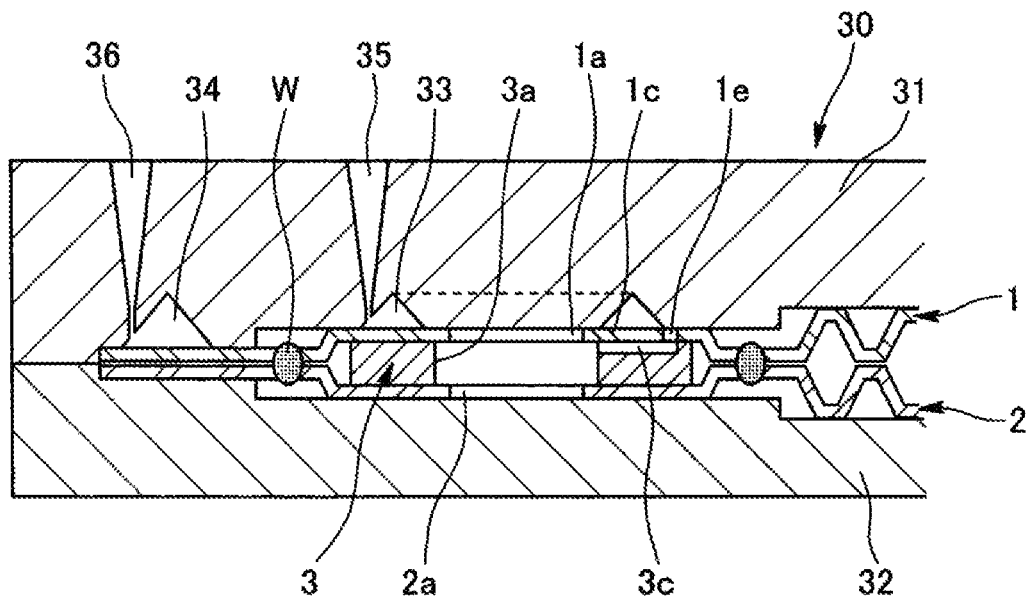
FIG. 11 is a cross-sectional view illustrating a state where the separators and the spacer are disposed in the mold is cut at the position corresponding to the III-III line of FIG. 1 in the first embodiment of the production method for a separator integrated gasket for fuel cells according to the present invention.
Figure 12:
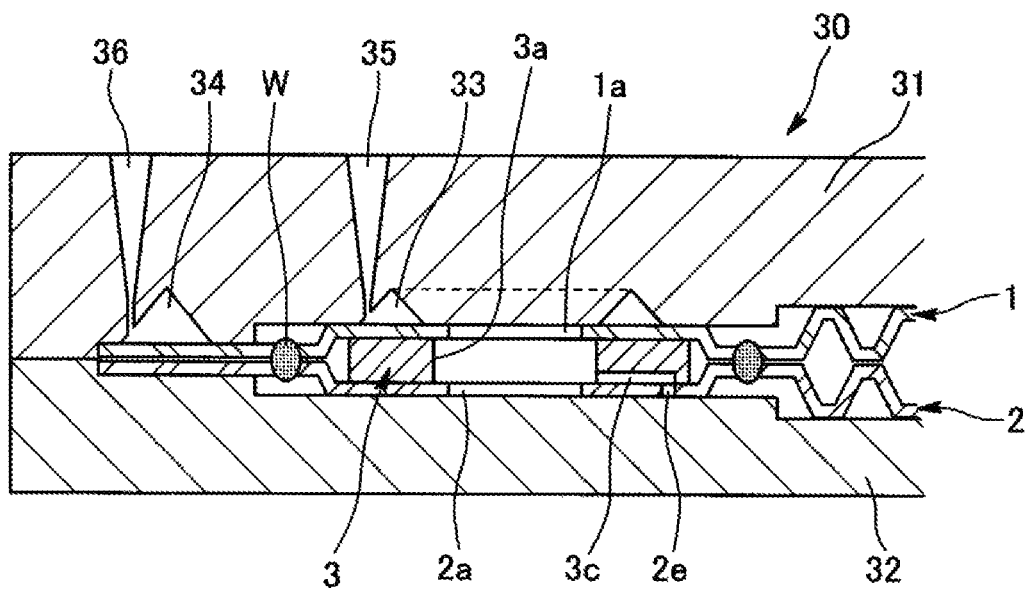
FIG. 12 is a cross-sectional view illustrating a state where the separators and the spacer are disposed in the mold is cut at the position corresponding to the IV-IV line of FIG. 1 in the first embodiment of the production method for a separator integrated gasket for fuel cells according to the present invention.

Next, an assembly of the separators 1 and 2 and the spacer 3 is set in a vulcanization molding mold 30, i.e., the separators 1 and 2 are positioned and disposed between split molds 31 and 32 of the mold 30, as illustrated in FIG. 10 to FIG. 12. Then, a liquid rubber molding material is injected and charged into cavities 33 and 34 defined between the inner surface of the split mold 31 and the separation portion 1c of the separator 1 by mold clamping via gates 35 and 36 formed in the split mold 31.

Figure 13:
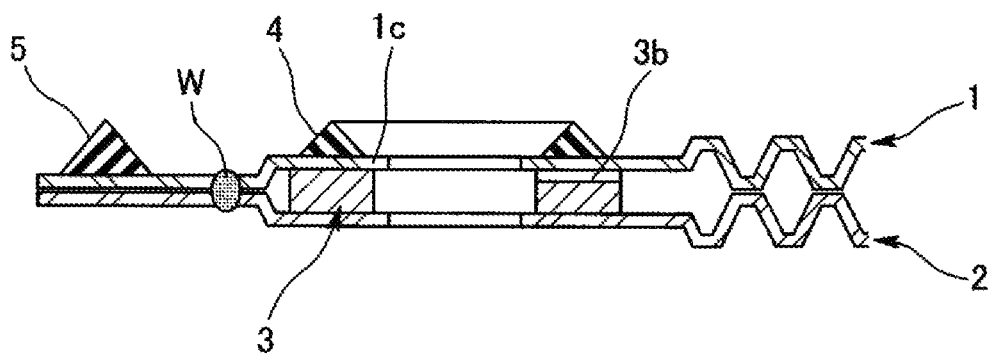
FIG. 13 is a cross-sectional view illustrating a state where gaskets are molded on one separator is cut at the position corresponding to the II-II line of FIG. 1 in the first embodiment of the production method for a separator integrated gasket for fuel cells according to the present invention.
Figure 14:
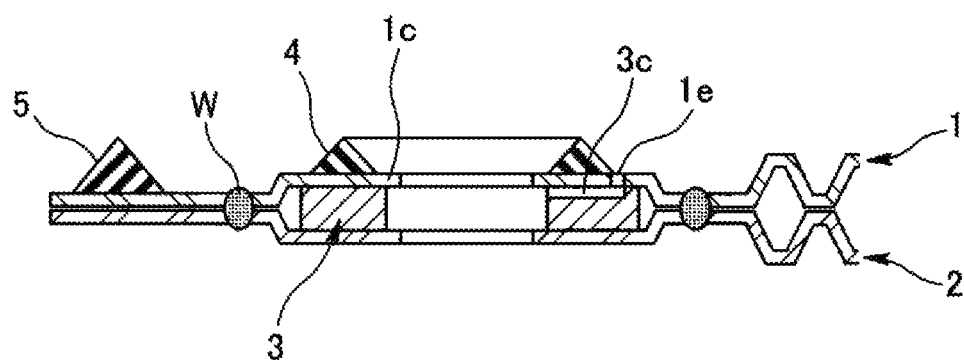
FIG. 14 is a cross-sectional view illustrating a state where the gaskets are molded on one separator is cut at the position corresponding to the III-III line of FIG. 1 in the first embodiment of the production method for a separator integrated gasket for fuel cells according to the present invention.
Figure 15:
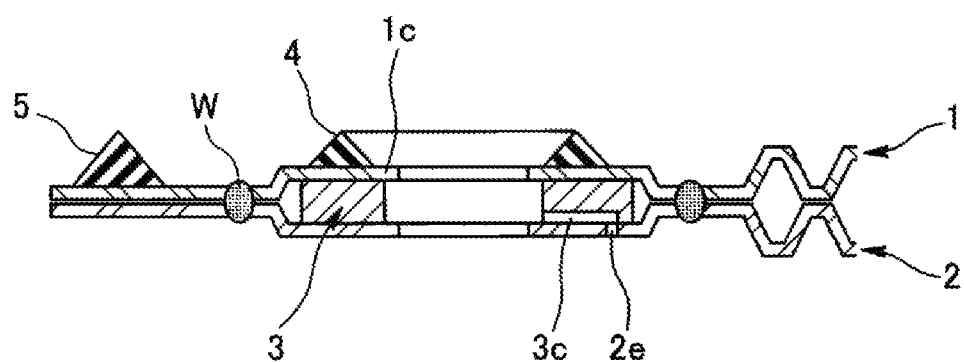
FIG. 15 is a cross-sectional view illustrating a state where the gaskets are molded on one separator is cut at the position corresponding to the IV-IV line of FIG. 1 in the first embodiment of the production method for a separator integrated gasket for fuel cells according to the present invention.

In this molding process, a bending load acts on the separation portion 1c of the separator 1 by the pressure of the rubber molding material injected and charged into the cavities 33 and 34. However, the separation portion 1c is backed up by the spacer 3, and thus is not bent and deformed. Therefore, in the gaskets 4 and 5 bonded to the separator 1 together with the molding as illustrated in FIG. 13 to FIG. 15 by curing of the rubber molding materials in the cavities 33 and 34, the generation of burr is also suppressed and the accuracy is high.

Figure 16:
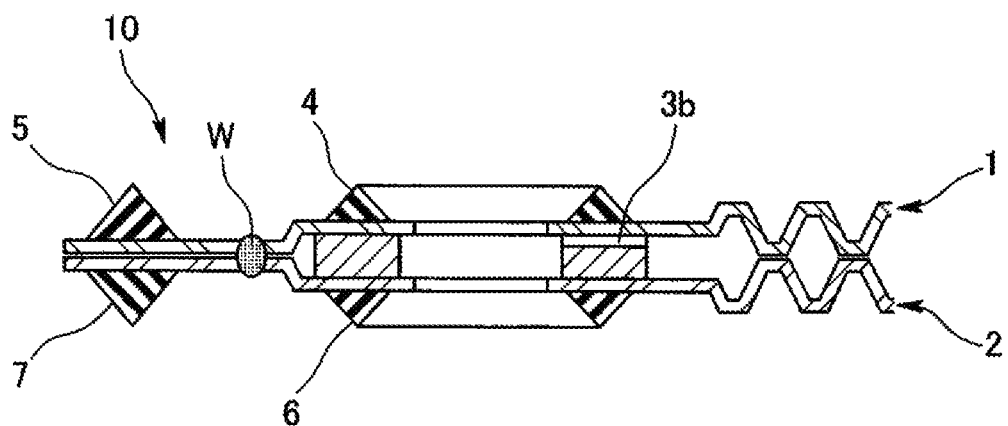
FIG. 16 is a cross-sectional view illustrating a produced separator integrated gasket for fuel cells cut at the position corresponding to the II-II line of FIG. 1 in the first embodiment of the production method for a separator integrated gasket for fuel cells according to the present invention.
Figure 17:
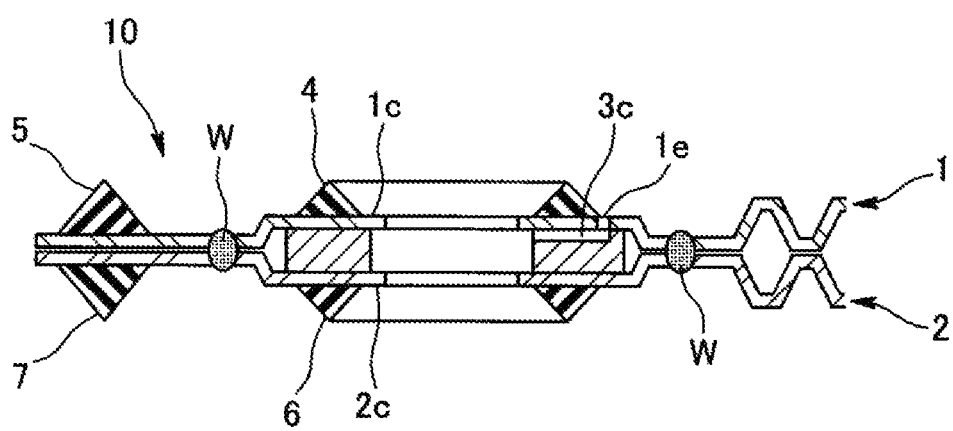
FIG. 17 is a cross-sectional view illustrating the produced separator integrated gasket for fuel cells cut at the position corresponding to the III-III line of FIG. 1 in the first embodiment of the production method for a separator integrated gasket for fuel cells according to the present invention.
Figure 18:
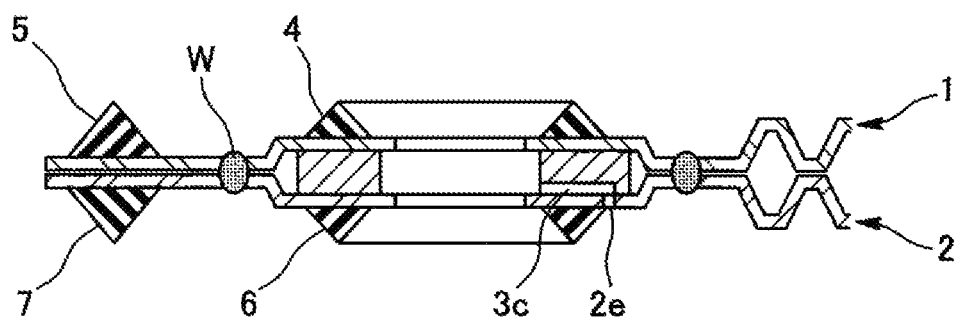
FIG. 18 is a cross-sectional view illustrating the produced separator integrated gasket for fuel cells cut at the position corresponding to the IV-IV line of FIG. 1 in the first embodiment of the production method for a separator integrated gasket for fuel cells according to the present invention.

Next, the gaskets 6 and 7 are molded and bonded also to the separator 2 as illustrated in FIG. 16 to FIG. 18 by the same molding process as described above, whereby the separator integrated gasket 10 can be obtained.

Then, in a fuel cell in which the separator integrated gaskets 10 thus produced are stacked with the MEAs 20 as illustrated in FIG. 2 to FIG. 4, not only the fact that defective molding of the gaskets 4 and 6 by the bending and deformation of the separation portions 1c and 2c of the separators 1 and 2, respectively, in the gasket molding process is prevented as described above but that the bending and deformation of the separation portions 1c and 2c of the separators 1 and 2, respectively, by the compression reaction force of the gaskets 4 and 6 is prevented, and therefore a reduction in sealability due to insufficient surface pressure of the gaskets 4 and 6 does not occur. Moreover, the flow passages for a coolant, an oxidizer gas, a fuel gas, and the like are secured by the grooves 3b and 3c in the spacers 3, and therefore the flow of the fluids is not blocked.

Next, FIG. 19 to FIG. 22 illustrate a second embodiment. The second embodiment is different from the first embodiment described above in that the molding and bonding of the gaskets 4 and 5 to the separator 1 and the molding and bonding of the gaskets 6 and 7 to the separator 2 are simultaneously performed.

More specifically, in this embodiment, through holes 1f and 1g are opened beforehand in the separation portion 1c of the separator 1, through holes 2f and 2g are opened at the positions corresponding to the through holes 1f and 1g of the separator 1 in the separation portion 2c of the separator 2, and through holes 3d and 3e communicating with the through holes 1f and 1g of the separator 1 and the through holes 2f and 2g of the separator 2 in the stacked state are opened in the spacer 3. The through holes 3d and 3e of the spacer 3 are opened avoiding the grooves 3c (or 3b).

Figure 19:
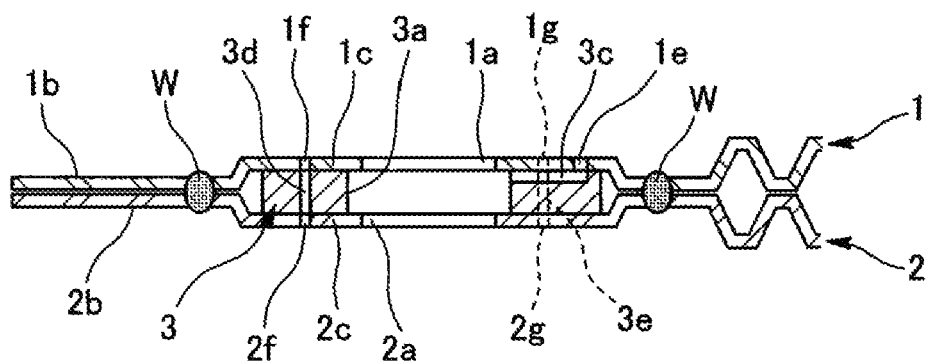
FIG. 19 is a cross-sectional view illustrating a state where the separators stacked via the spacer are welded is cut at the position corresponding to the III-III line of FIG. 1 in the second embodiment of the production method for a separator integrated gasket for fuel cells according to the present invention.
Figure 20:
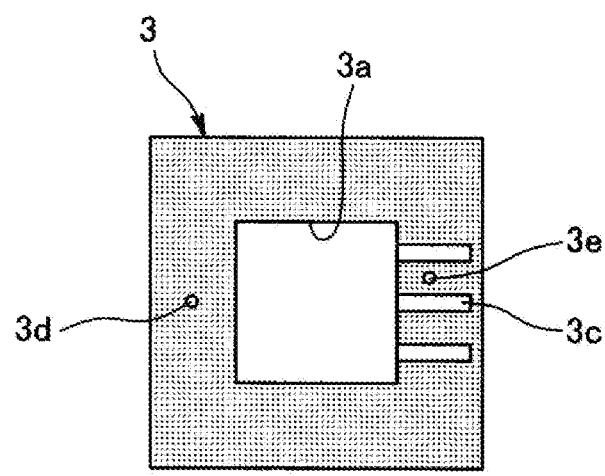
FIG. 20 is a plan view illustrating a spacer used in a second embodiment.

Then, the separators 1 and 2 and the spacer 3 thus configured are positioned and stacked as illustrated in FIG. 19, and then the adjacent portions 1b and 2b of the separators 1 and 2, respectively, are welded, whereby the separators 1 and 2 are integrated via the welded portions W.

Figure 21:
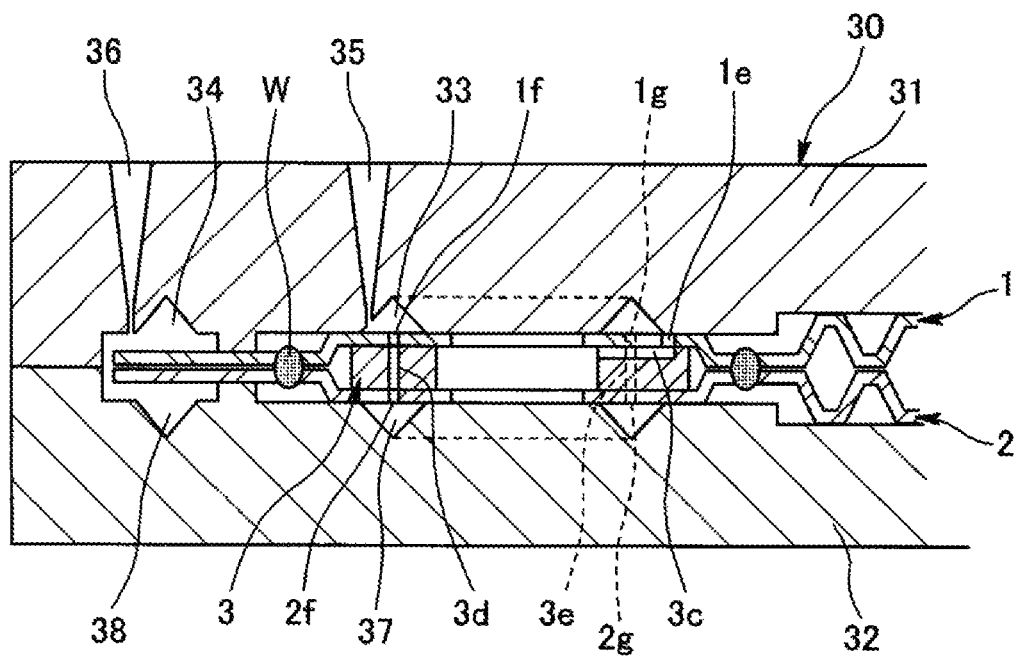
FIG. 21 is a cross-sectional view illustrating a state where separators and the spacer are disposed in a mold is cut at the position corresponding to the III-III line of FIG. 1 in the second embodiment of the production method for a separator integrated gasket for fuel cells according to the present invention.

Next, an assembly of the separators 1 and 2 and the spacer 3 is set in the vulcanization molding mold 30 as illustrated in FIG. 21, i.e., the separators 1 and 2 are positioned and disposed between the split molds 31 and 32 of the mold 30, and then mold clamped. In the mold 30, the cavities 33 and 34 are defined between the inner surface of the split mold 31 and the separator 1 by mold clamping and the cavities 37 and 38 are defined between the inner surface of the split mold 32 and the separator 2. At this time, the cavity 33 and the cavity 37 communicate with each other through the through holes 1f, 3d, and 2f and the via holes 1g, 3e, and 2g and the cavity 34 and the cavity 38 communicate with each other on the outer periphery sides of the separators 1 and 2.

Then, when a liquid rubber molding material is injected into the cavities 33 and 34 on the split mold 31 side via the gates 35 and 36 formed in the split mold 31, the rubber molding material is also charged into the cavities 37 and 38 on the split mold 32 side through the through holes 1f, 3d, and 2f, the through holes 1g, 3e, and 2g, and the outer periphery sides of the separators 1 and 2.

Figure 22:
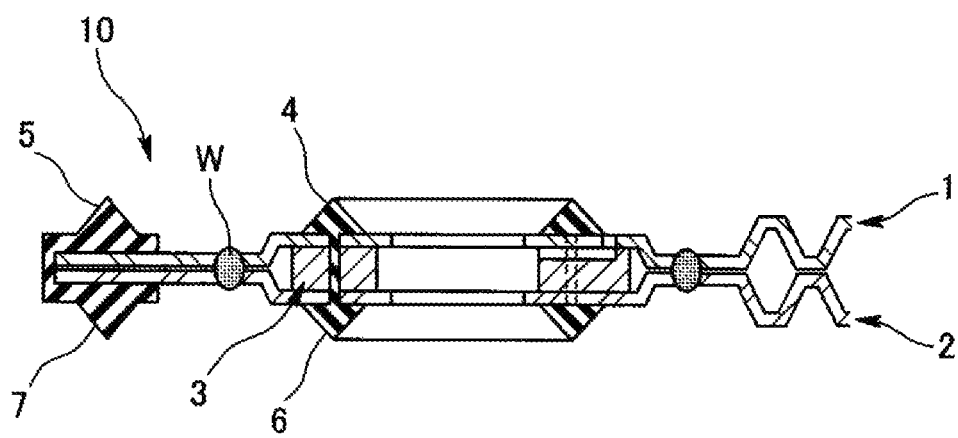
FIG. 22 is a cross-sectional view illustrating a produced separator integrated gasket for fuel cells cut at the position corresponding to the III-III line in FIG. 1 in the second embodiment of the production method for the separator integrated gasket for fuel cells according to the present invention.

In this molding process, a bending load acts on the separation portion 1c of the separator 1 and the separation portion 2c of the separator 2 by the pressure of the rubber molding materials charged into the cavities 33 and 34 and the cavities 37 and 38. However, the separation portions 1c and 2c are backed up by the spacer 3, and thus are not bent and deformed, so that the gaskets 4 and 5 on the separator 1 side and the gaskets 6 and 7 on the separator 2 side can be molded simultaneously and with good accuracy as illustrated in FIG. 22. Moreover, the separator integrated gasket 10 thus obtained is structured so that the gaskets 4 and 5 on the separator 1 side and the gaskets 6 and 7 on the separator 2 side are continuous to each other, and therefore the bonding strength with the separators 1 and 2 can be improved.

Next, FIG. 23 to FIG. 26 illustrate a third embodiment. The third embodiment is different from the first and second embodiments described above in that the spacer 3 contains a porous material of a three-dimensional mesh shape.

Figure 23:
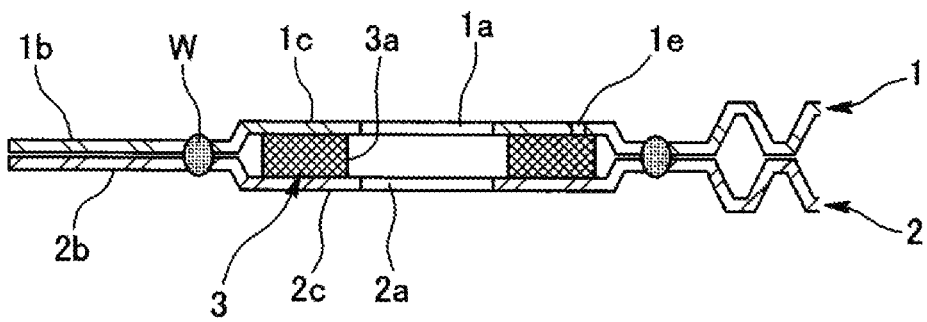
FIG. 23 is a cross-sectional view illustrating a state where separators stacked via the spacer are welded cut at the position corresponding to the III-III line of FIG. 1 in a third embodiment of the production method for a separator integrated gasket for fuel cells according to the present invention.
Figure 24:
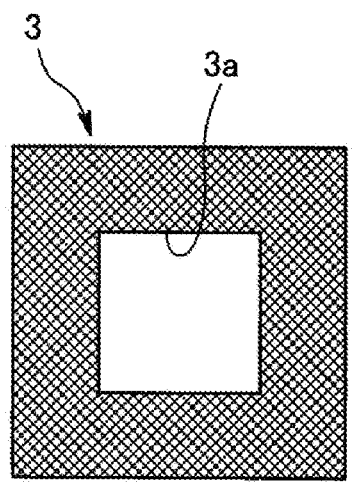
FIG. 24 is a plan view illustrating a spacer used for the position illustrated in FIG. 25.

More specifically, when molding gaskets, the separators 1 and 2 are first positioned and stacked via the spacer 3 as illustrated in FIG. 23, and then the adjacent portions 1b and 2b of the separators 1 and 2 are welded, whereby the separators 1 and 2 are integrated via the welded portions W also in this embodiment. The spacer 3 is formed by the porous material of a three-dimensional mesh shape as illustrated also in FIG. 24 to thereby enable the circulation of a fluid in a direction orthogonal to the stacking direction, and therefore grooves for flow passages are not formed, and thus the spacer 3 has required rigidity which allows the spacer 3 to back up the adjacent portions 1b and 2b of the separators 1 and 2.

Figure 25:
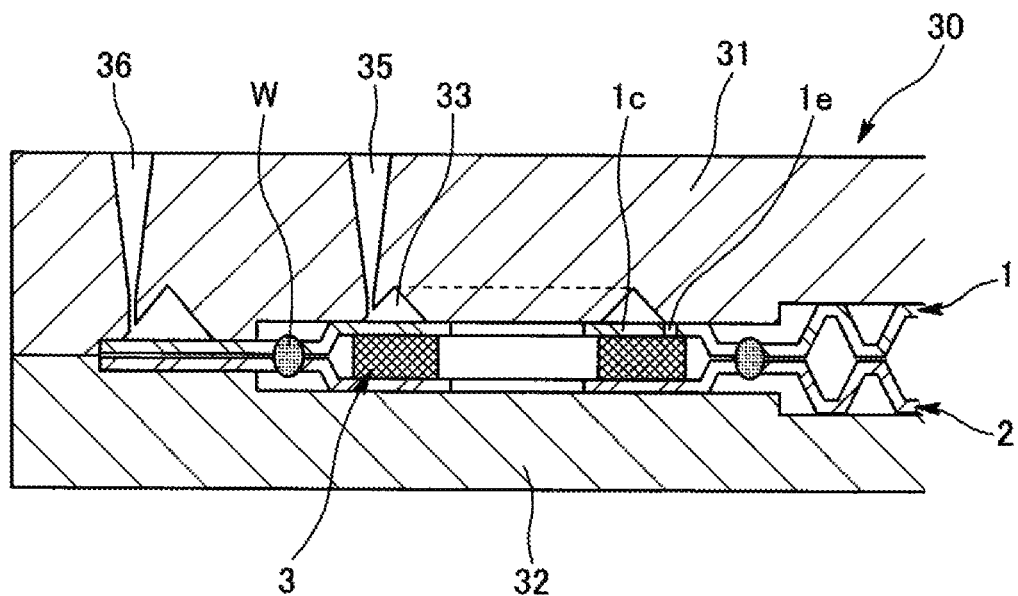
FIG. 25 is a cross-sectional view illustrating a state where separators and the spacer are disposed in a mold is cut at the position corresponding to the III-III line of FIG. 1 in the third embodiment of the production method for a separator integrated gasket for fuel cells according to the present invention.
Figure 26:
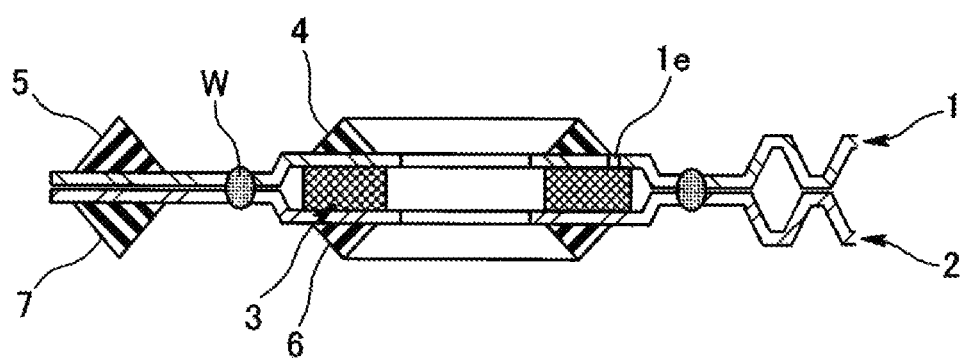
FIG. 26 is a cross-sectional view illustrating a state where gaskets are molded on both the separators is cut at the position corresponding to the III-III line of FIG. 1 in the third embodiment of the production method for a separator integrated gasket for fuel cells according to the present invention.

Next, an assembly of the separators 1 and 2 and the spacer 3 is set in the vulcanization molding mold 30 as illustrated in FIG. 25, and then the separator integrated gasket 10 as illustrated in FIG. 26 can be obtained by the same molding process as described above. Also in this case, the gaskets 4 and 5 on the separator 1 side and the gaskets 6 and 7 on the separator 2 side may be simultaneously molded as with the second embodiment.

Figure 27:
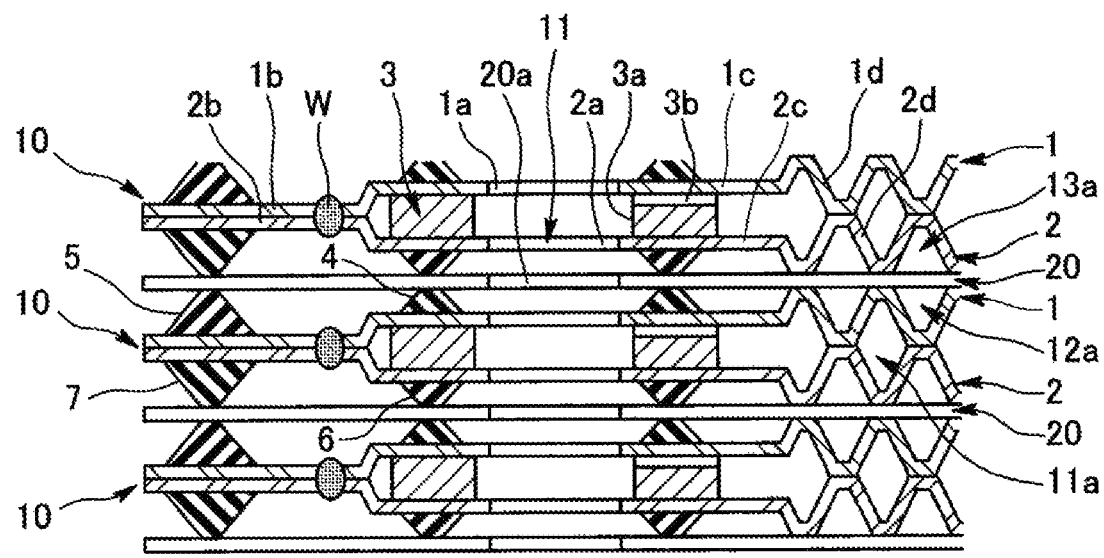
FIG. 27 is a cross-sectional view illustrating a stacked state in which adjacent portions are in contact with each other in a fuel cell provided with the separator integrated gasket for fuel cells produced by the production method for the separator integrated gasket for fuel cells according to the present invention.
Figure 28:
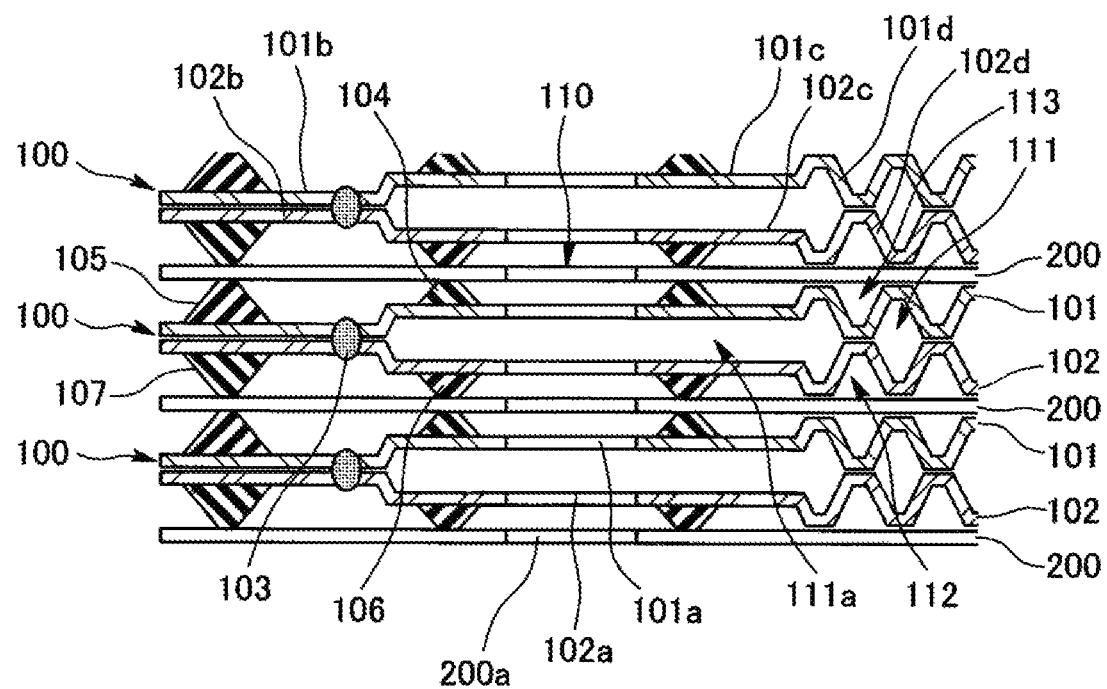
FIG. 28 is a partial cross-sectional view illustrating a stacked state of a separator integrated gasket for fuel cells produced by a conventional technique.
Figure 29:
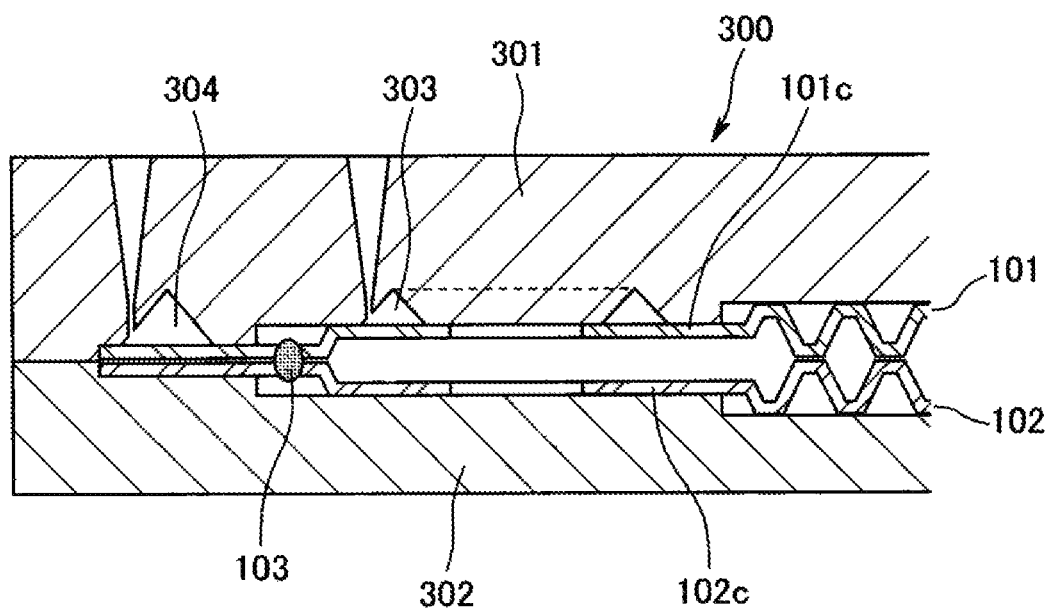
FIG. 29 is a partial cross-sectional view illustrating a production method for the separator integrated gasket for fuel cells according to the conventional technique.
Figure 30:
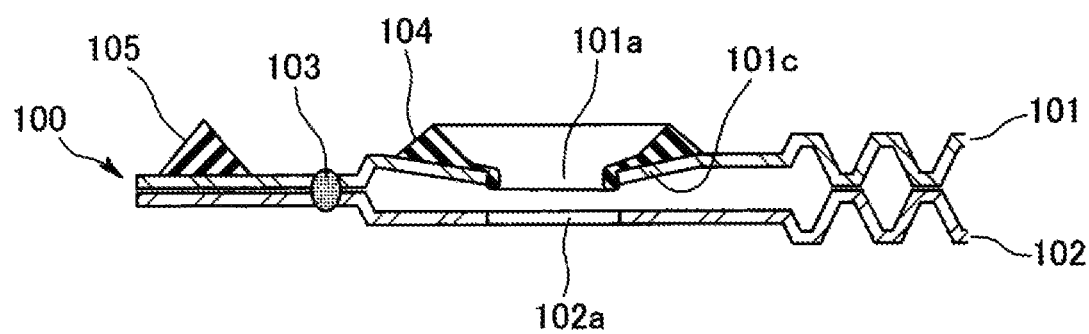
FIG. 30 is a partial cross-sectional view illustrating a modified state of the separator integrated gasket for fuel cells produced by the conventional technique.

In the examples described above, space is present between the adjacent portions 1b and 2b of the separators 1 and 2, between projections and recesses for the flow passage grooves 1d and 2d, and between projections and recesses for the flow passage grooves 1d and 2d of the separators 1 and 2, respectively, and the MEAs 20. However, the present invention is applicable to the production of a separator integrated gasket for fuel cells in a stacked state in which the adjacent portions 1b and 2b of the separators 1 and 2, respectively, projections and recesses of the flow passage grooves 1d and 2d, and projections and recesses of the flow passage grooves 1d and 2d of the separators 1 and 2, respectively, and the MEAs 20 are in contact with each other as illustrated in FIG. 27, for example.

The invention claimed is:

1. A production method for a separator integrated gasket for fuel cells comprising:
   stacking a pair of separators having adjacent portions approaching each other and separation portions separating from each other in a stacked state and manifold holes opened in the separation portions via a spacer in which an inner peripheral hole is opened and which enables circulation of a fluid in a direction orthogonal to a stacking direction so that the manifold holes and the inner peripheral hole are continuous to each other;
   disposing a stacked object of the pair of separators and the spacer in a mold; and
   charging a rubber molding material into a gasket molding cavity defined between a surface of one of the separators opposite to the spacer in the separators and the mold, and curing the rubber molding material.

2. The production method for a separator integrated gasket for fuel cells according to claim 1, wherein
   the pair of separators is welded with each other.

3. The production method for a separator integrated gasket for fuel cells according to claim 1, wherein
   the spacer includes a groove or a second hole formed therein configured to circulate a fluid in the direction orthogonal to the stacking direction.

4. The production method for a separator integrated gasket for fuel cells according to claim 1, wherein
   a body of the spacer is formed of a porous mesh configured to circulate a fluid in the direction orthogonal to the stacking direction.

5. The production method for a separator integrated gasket for fuel cells according to claim 2, wherein
   the spacer includes a groove or a second hole formed therein configured to circulate a fluid in the direction orthogonal to the stacking direction.

6. The production method for a separator integrated gasket for fuel cells according to claim 2, wherein
   a body of the spacer is formed of a porous mesh configured to circulate a fluid in the direction orthogonal to the stacking direction.

* * * * *